Jan. 9, 1973   A. D. WEBB   3,709,739
ELECTRIC POWER GENERATOR
Filed Dec. 21, 1971   2 Sheets-Sheet 1

United States Patent Office 3,709,739
Patented Jan. 9, 1973

3,709,739
ELECTRIC POWER GENERATOR
Alan David Webb, 44 Heathside,
Hinchley Wood, England
Continuation-in-part of application Ser. No. 804,615, Mar. 5, 1969. This application Dec. 21, 1971, Ser. No. 210,460
Claims priority, application Great Britain, Mar. 7, 1968, 11,107/68
Int. Cl. H01v 1/02
U.S. Cl. 136—208                    6 Claims

ABSTRACT OF THE DISCLOSURE

An electric power generator for petroleum wells comprises thermocouples connected into a series/parallel arrangement having their hot junctions in thermal contact with the petroleum and their cold junctions in contact with the surroundings so that electric power is generated by the Seebeck effect.

---

This invention relates to an electric power generator and this application is a continuation-in-part of co-pending application Ser. No. 804,615, filed Mar. 5, 1969, for "Electric Power Generator," and now abandoned.

BACKGROUND OF THE INVENTION

Sources of crude petroleum (which, for the purposes of this specification, includes natural gas) are often located in isolated positions where it is inconvenient to station personnel to operate the well head equipment needed to produce the petroleum. Gas wells located in the North Sea are an example of such an isolated position where it is clearly difficult to arrange frequent visits by personnel and it is therefore conventional to control such equipment by means of radio signals. In order to operate the radio (and any associated electronic equipment) electric power is needed and it is an object of this invention to provide a suitable generator suitable for use on a rig producing crude petroleum whose natural temperature is above that of the rig's surroundings.

SUMMARY OF THE INVENTION

According to the invention an electric power generator, suitable for use at a petroleum well head, comprises a plurality of thermopiles, that is, a plurality of assemblies of thermocouples each thermocouple having one junction in thermal contact with the outer surface of a conduit for carrying the crude petroleum and the other junction in thermal contact with the inner surface of an outer sheath, the thermocouples of each thermopile being electrically connected in series and the thermopiles being connected in parallel whereby, during the use of the generator, the difference of temperature between the petroleum and the surroundings produces electric power by means of the Seebeck effect.

Since thermocouple assemblies, that is, thermopiles, are commercially available as modules having flat surfaces it is convenient for the conduit to have all, or at least a substantial proportion of, its outer surfaces flat.

Preferably, the wall of the conduit is sufficiently strong to contain the pressure of the crude petroleum (which may be substantially above atmospheric). With this arrangement, particularly when the generator is intended for installation in deep water, the outer sheath conveniently takes the form of one or more membranes so that, during the use of the generator, the external pressure is transmitted via the thermopiles whereby good thermal contact is maintained both at the sheath and the conduit.

In an alternative form, which is particularly suitable for use when the generator is intended for use in air, the outer sheath is pressure resistant and the wall of the conduit is thin enough to allow transmission of the internal pressure via the thermopiles whereby good thermal contact is maintained both at the sheath and the conduit. In this alternative form the sheath preferably takes the form of a tubular casing and the thermopiles are situated in the annular space between the casing and the conduit.

If desired more than one generator can be provided on one rig (the crude petroleum flow may be either series or parallel) and the whole or only a part of the crude petroleum flow may pass through the generator or generators.

While generators according to the invention can conveniently provide enough power to operate the radio and associated electronic circuitry they are not suitable for providing enough power to operate control valves. This limitation can be overcome by the use of valves operated hydraulically (or pneumatically) using the pressure of the crude petroleum as the power source. In this case the electric power requirement is substantially reduced.

Alternatively the generator according to the invention can be used to charge the electric accumulators and the power from the accumulators used to operate electrically actuated valves. In this case the accumulators charge for long periods at low wattage and discharge for short periods at a relatively high wattage.

BRIEF DESCRIPTION OF THE DRAWINGS

The invention will now be described, by way of example, with reference to the drawings in which.

Figure 1:
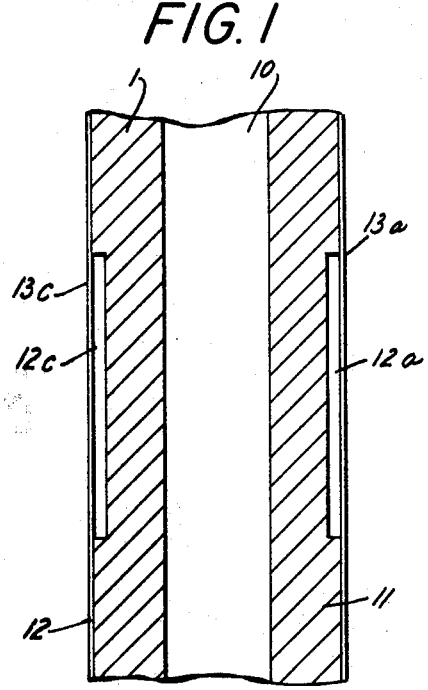
FIG. 1 is a vertical cross-section through a generator according to the invention intended for undersea use.
Figure 2:
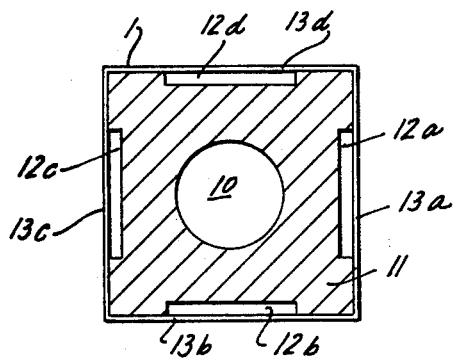
FIG. 2 is a horizontal cross-section through the generator shown in FIG. 1.

The electric power generator shown in FIGS. 1 and 2 is intended for installation in deep water, i.e., in a relatively high pressure environment (say 100 fathoms below the surface). It comprises a metal conduit 1 which has a cylindrical bore 10. The wall 11 of the conduit 1 is thick enough and sufficiently strong to contain the pressure of the crude petroleum (which flows through the conduit from a well not shown in any drawing). Conventionally, metal conduits for carrying crude petroleum are made of steel and have a wall thickness and strength capable of withstanding internal pressures of at least 10,000 pounds per square inch. The external cross-section of the conduit 1 is a square, as is best seen in FIG. 2, with recesses in the flat sides of the wall 11 into which the thermopiles 12a, 12b, 12c and 12d are fitted. As fitted in these recesses, the inner surface of each thermopile constitutes a hot junction surface and the outer surface a cold junction surface. The outer sheath is of metal, e.g., copper, and takes the form of relatively thin membranes 13a, 13b, 13c and 13d of a thickness, for example, of .0001 mm. to 1 cm. which exclude the sea water from physical contact with the thermopiles while transmitting the outer pressure of the water to the thermopiles and, in turn, to the conduit wall 11 to ensure good thermal contact between the cold junctions of the thermopiles 12a, 12b, 12c and 12d and the membranes 13a, 13b, 13c and 13d, respectively, and between the hot junctions of the thermopiles and the conduit wall 11.

Figure 3:
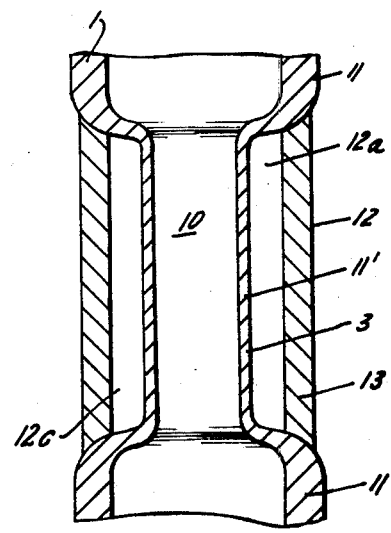
FIG. 3 is a vertical cross-section through a generator according to the invention intended for use in air.
Figure 4:
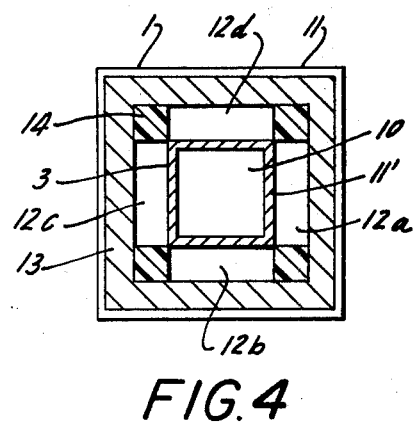
FIG. 4 is a horizontal cross-section through the generator shown in FIG. 1, and FIGS. 5 and 6 show alternative arrangements for use when higher electric power is required and several generators according to the invention are installed on one rig.

The electric power generator shown in FIGS. 3 and 4 is intended for use in air, i.e., in a relatively low pressure environment. It comprises a metal conduit 1 having a square cross-section, which is circumferentially recessed over a portion of its length to provide an annular space or recess 3 having a relatively thin bottom wall 11'. The wall 11' is too thin to contain the pressure of the crude petroleum (which flows through the conduit from a well not shown in any drawing).

In this instance, therefore, the outer sheath takes the form of a tubular metal casing 13 (having a square cross-section) which surrounds the annular recess 3 and which, like the conduit wall 11, is sufficiently thick and strong to contain the internal pressure of the crude petroleum. The thermopiles 12a, 12b, 12c and 12d are situated in the annular space or recess 3 between the casing 13 and the wall 11' and the corners are filled with a pressure resistant, heat insulating material such as a plastic or an oil (represented in FIG. 4 by the numeral 14). With this arrangement, the thermopiles 12a, 12b, 12c and 12d transmit the internal pressure of the crude petroleum from the wall 11' to the casing 13 and thereby ensure good thermal contact between the cold junctions of the thermopiles 12a, 12b, 12c and 12d and the casing 13 and between the hot junctions of the thermopiles and the conduit wall 11'.

As noted above, thermocouple assemblies, that is, thermopiles, are commercially available in the form of modules (with flat working surfaces) each of which contains a large number of thermocouples of the p- and n-forms of bismuth telluride connected thermally in parallel and electrically in series.

Figure 7:
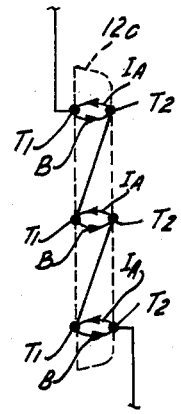
FIG. 7 is a diagrammatic view of one of the thermopiles or thermocouple assemblies of the generator of FIG. 3, showing the thermocouples of the assembly electrically connected together in series; and, FIG. 8 is a diagrammatic view showing the thermopiles or thermocouple assemblies of the generator of FIG. 3 electrically connected in parallel.

FIG. 7 depicts such a module corresponding to the thermopile 12c of FIG. 3, the module being represented diagrammatically as having three individual thermocouples each providing a continuous circuit of two metals A and B whose junctions $T_1$ and $T_2$ are at different temperatures. T represents the thermoelectric current which flows in the circuit. A is customarily referred to as thermoelectrically positive to B if $T_1$ is the colder junction. The thermocouples of the modules are shown as connected electrically in series with their hot junctions $T_2$, like the cold junctions $T_1$, being connected thermally in parallel.

Figure 8:
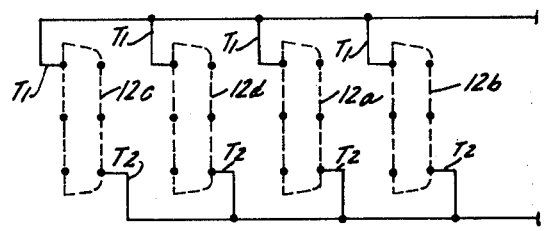

FIG. 8 depicts the several thermopile modules 12a, 12b, 12c and 12d electrically connected in parallel arrangement.

These modules (or other equivalent modules) are used to provide the thermocouples 12 shown in FIGS. 1–4. They are connected into a series/parallel arrangement so as to produce 200 watts of power at 24 volts (no attempt is made to illustrate individual thermocouples or modules). All the modules are connected thermally in parallel and each module is exposed to the difference in temperature between the crude petroleum and the outside environment, e.g. the North Sea. Since the petroleum is at a temperature of, say 35° C., and the North Sea varies from 0° C. to 15° C. the modules are submitted to a temperature difference of at least 20° C.

Figure 5:
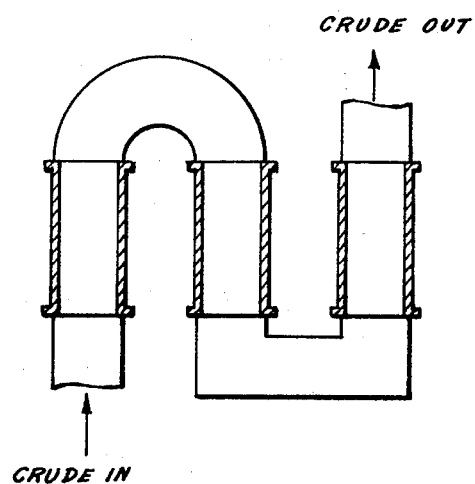
FIG. 5 shows several generators in a series arrangement and FIG. 6 shows a parallel arrangement.
Figure 6:
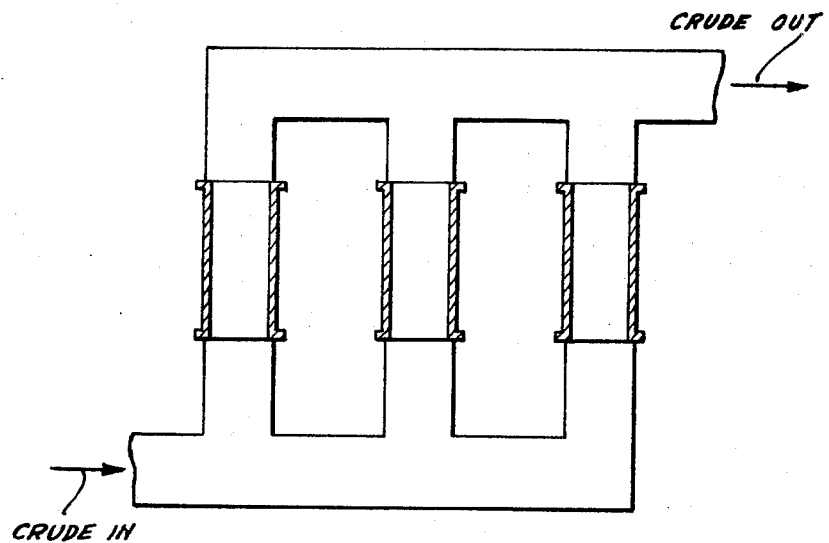

The generator just described produces 200 watts of electric power and this represents such a small proportion of the total thermal energy available in the crude petroleum that there is effectively no temperature drop as the petroleum passes through the generator. If more than 200 watts of power are required several generators as shown in FIGS. 1–4 may be installed on a single rig. In such a case the petroleum may pass through the generators in series, as shown in FIG. 5, or in parallel, as shown in FIG. 6.

It is convenient to pass the entire flow of crude petroleum from the well through the generator (or through one of the generators if there is more than one) or the generator may be installed in a branch line so that only a proportion of total production passes through it.

Having thus described this invention, what is claimed is:

1. A petroleum well head electric power generator for use on a rig producing crude petroleum whose natural temperature is above that of the rig's surroundings, which comprises:

(a) a well head positioned above ground level, a petroleum well positioned below ground level, a steel conduit capable of withstanding a pressure of at least 10,000 p.s.i. for conducting the crude petroleum from said well below ground level to said well head above ground level, said conduit having a recess in its outer surface above ground level, said steel conduit positioned between and connected to said well and said well head and having crude petroleum flowing therethrough;

(b) a thermopile having a hot junction surface and a cold junction surface, said thermopile being fitted in said recess and having its thermalcouples electrically connected in series; and, (c) an outer metal sheath covering said recess for excluding the surroundings from physical contact with said thermopile, said thermopile having its cold junction surface in thermal contact with the inner surface of said sheath and having its hot junction surface in thermal contact with the bottom surface of said recess, so that, during use of the generator, the difference of pressure at said recess between the petroleum being conducted through said conduit and the conduit's surroundings is transmitted by said thermopile thereby ensuring good thermal contact between said cold junction surface and the inner surface of said sheath and between said hot junction surface and said bottom surface of said recess, and the difference of temperature at said recess between said petroleum and the conduit's surroundings produces electric power from said thermopile by means of the Seebeck effect.

2. An electric power generator according to claim 1, particularly suitable for installation in deep water, in which said conduit has a plurality of recesses in its outer surface between the ground level and the water level, in which a plurality of thermopiles each having a hot junction surface and a cold junction surface are fitted in said recesses, each said thermopile having its thermocouples electrically connected in series and said thermopiles being electrically connected in parallel, and in which said outer metal sheath covers said recesses for excluding the water from physical contact with said thermopiles, said thermopiles having their cold junction surfaces in thermal contact with the inner surface of said outer metal sheath and having their hot junction surfaces in thermal contact with the bottom surfaces of said recesses, so that, during use of the generator, the difference of pressure at said recesses between the petroleum being conducted through said conduit and the surrounding water is transmitted by said thermopiles thereby ensuring good thermal contact between said cold junction surfaces and the inner surface of said sheath and between said hot junction surfaces and said bottom surfaces of said recesses, and the difference in temperature at said recesses between said petroleum and the surrounding water produces electric power from said thermopiles by means of the Seebeck effect.

3. An electric power generator according to claim 2, in which said conduit is of square cross-section providing flat outer faces in which said recesses are located and has a cyilndrical bore, and in which said outer metal sheath takes the form of thin metal membranes covering the respective recesses.

4. An electric power generator according to claim 2, in which said thin metal membranes have a thickness of .0001 mm. to 1 cm.

5. An electric power generator in accordance with claim 1, particularly suitable for installation in air, in which said conduit is provided with a circumferentially extending annular recess having a relatively thin bottom wall; in which a plurality of thermopiles each having a hot junction surface and a cold junction surface are fitted in said annular recess, said thermopiles each having its thermocouples electrically connected together in series and said thermopiles being electrically connected together in parallel; and in which said outer sheath is in the form of a relatively thick tubular metal casing which covers said recess and forms with said conduit a sealing closure for said annular recess for excluding the surrounding air from physical contact with said thermopiles, said casing being capable of withstanding a pressure of at least 10,000 p.s.i., each said thermopile having its cold junction surface in thermal contact with the inner surface of said casing and having its hot junction surface in thermal contact with the outer surface of said bottom wall, so that, during use of the generator, the difference of pressure at said recesses between the petroleum being conducted by said conduit and the surrounding air is transmitted by said thermopiles thereby ensuring good thermal contact between said cold junction surfaces of the thermopiles and said inner surface of said casing and between said hot junction surfaces of said thermopiles and said outer surface of said bottom wall, and the difference of temperature at said recesses between the petroleum being conducted through said conduit and the surrounding air produces electric power from said thermopiles by means of the Seebeck effect.

6. An electric power generator in accordance with claim 5, in which said conduit and said annular recess are of rectangular cross-section, and in which the corners of said annular recess are filled with a pressure resistant heat insulating material.

References Cited

UNITED STATES PATENTS

| | | | |
|---|---|---|---|
| 3,035,416 | 5/1962 | Wagner | 136—208 |
| 3,129,116 | 4/1964 | Corry | 136—208 |
| 3,262,820 | 7/1966 | Whitelaw | 136—208 |
| 3,481,794 | 12/1969 | Kasschau | 136—208 |

FOREIGN PATENTS

| | | | |
|---|---|---|---|
| 874,660 | 8/1961 | Great Britain | 136—208 |

CARL D. QUARFORTH, Primary Examiner

H. E. BEHREND, Assistant Examiner

U.S. Cl. X.R.

136—211; 166—65 R